(12) United States Patent　　(10) Patent No.: US 6,662,244 B1
Takahashi　　(45) Date of Patent: Dec. 9, 2003

(54) INFORMATION TERMINAL

(75) Inventor: Masahiro Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 526 days.

(21) Appl. No.: 09/629,726

(22) Filed: Jul. 31, 2000

(30) Foreign Application Priority Data

Jul. 30, 1999　(JP) .......................................... 11-217518

(51) Int. Cl.$^7$ .............................................. G06F 13/14
(52) U.S. Cl. ...................... 710/14; 379/433.07; 455/90; 455/566; 455/567
(58) Field of Search ...................... 710/14; 379/433.07; 455/90, 567, 566

(56) References Cited

U.S. PATENT DOCUMENTS

| | | | | |
|---|---|---|---|---|
| 6,377,685 B1 | * | 4/2002 | Krishnan | 379/433.07 |
| 6,415,138 B2 | * | 7/2002 | Sirola et al. | 455/90 |
| 6,438,392 B1 | * | 8/2002 | Toba | 455/567 |
| 6,504,928 B1 | * | 1/2003 | Toyooka | 379/433 |

* cited by examiner

*Primary Examiner*—Abdelmoniem Elamin
(74) *Attorney, Agent, or Firm*—Jay H. Maioli (57) ABSTRACT

An information terminal made up of a first housing 2 having a display section 5 and a second housing 3 having an input/display section 11 and can be made very small when said first housing 2 and said second housing 3 are folded relative to each other. An enhanced degree of operability in terms of inputting characters and displaying a large volume of data is provided.

3 Claims, 8 Drawing Sheets

INFORMATION TERMINAL

BACKGROUND OF THE INVENTION

1. Field of the Invention

This invention relates to an information terminal having a foldable structure.

2. Description of the Related Background Art

Portable information terminals of wireless communications systems for transmitting/receiving information have become very popular in recent years. Portable information terminals include those of portable telephone systems and personal handyphone systems (PHS) (hereinafter referred to as portable telephone sets).

Figure 1:
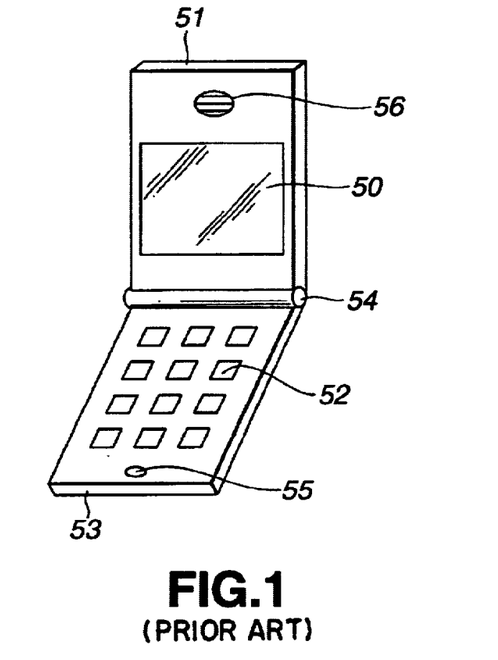
FIG. 1 is a schematic perspective view of a known portable telephone set held in an open state.

FIG. 1 of the accompanying drawings shows a known portable telephone set comprising a housing 51 having a display section 50, another housing 53 having a key input section 52 and a hinge section 54, the housings 51 and 53 being adapted to be foldable relative to each other and put together.

Thus, such a portable telephone set becomes very small and hence easy to carry when it is not in use and the housings 51 and 53 are folded. Additionally, when the housings are folded, the display section 50 is protected against damage and the input section 52 is prevented from erroneous key operations.

When, on the other hand, the housings 51 and 53 are opened from each other by an appropriate angle for use, the microphone 55 and the loudspeaker of the portable telephone set become separated from each other by a distance corresponding to the distance between the mouth and one of the ears of the user to make the portable telephone set very comfortable for talking with the person at the other end of the line.

The display section 50 of the portable telephone set is used to display not only information on the ongoing telephone call but also information on unattended calls, the current condition of radio-wave propagation and so on that has to be seen frequently by the user.

Figure 2:
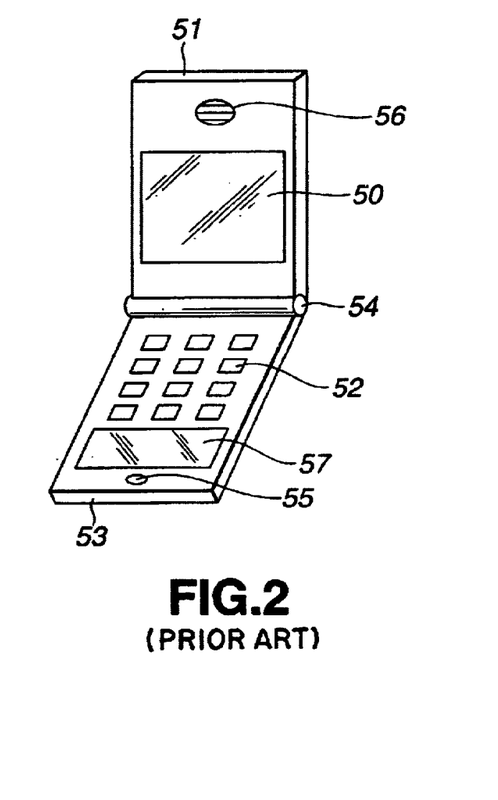
FIG. 2 is a schematic perspective view of a known portable telephone set held in an open state.

Then, the housings 51 and 53 of the foldable type portable telephone set have to be opened to expose the display section 50 each time the user wants to see the information of the latter category. Therefore, a portable telephone set having a transparent viewing window 57 arranged on the housing 53 as illustrated in FIG. 2 has been proposed to avoid the cumbersome operation of opening the housings 51 and 53 and to allow the user to see information without opening them.

Meanwhile, there is a strong demand for portable telephone sets provided with various sophisticated features of information terminals such as a large memory capacity for storing telephone numbers and other data and the capability of transmitting/receiving character data. Then, such a sophisticated portable telephone set is adapted to display on the display section 50 various character data such as the telephone number and name of a person to be stored in the memory or a written message received or to be transmitted by electronic mail.

However, the viewing window 57 arranged on the housing 53 of a portable telephone set has to be subjected to certain limitations in terms of position and area because the key input section contains mechanical contacts and occupies a considerable space. In other words, the viewing window 57 is forced to be small relative to the display section 50 so that the visibility of the display section 50 is not fully guaranteed by the viewing window 57.

If the area of the viewing window 57 is enlarged to improve the visibility of the information displayed on the display section 50, the intervals separating the button keys and/or the sizes of the button keys of the key input section 52 have to be reduced at the cost of the operability of the portable telephone set.

The display section 50 of known portable telephone sets is often not large enough for displaying all the character data received by way of the character transmission service of the telephone system at a time. Then, the display section 50 has to be provided with a scroll feature. In short, the display section 50 of conventional portable telephone sets is not large enough for dealing with the amount of character data normally processed at a time in the portable telephone set.

BRIEF SUMMARY OF THE INVENTION

In view of the above described circumstances, it is therefore the object of the present invention to provide an information terminal comprising a first housing having a display section and a second housing having an input/display section that are adapted to be folded relative to each other to make the portable telephone set very small that is excellent in terms of operability for inputting character data and has a capability of displaying a large volume of data.

According to the invention, the above object is achieved by providing an information terminal comprising a first housing having a display section for displaying information and a second housing having an input/display section for inputting and/or displaying information, said first and second housings being linked by a hinge mechanism fitted to an end of each of them so as to allow them to be folded relative to each other with said input/display section and said display section facing each other.

An information terminal according to the invention and having the above described configuration can be made very small when the first and second housing are folded relative to each other. Additionally, the information terminal provides excellent visibility and operability because the input/display section operates both as information input means and information display means.

DETAILED DESCRIPTION OF THE INVENTION

Now, the present invention will be described by referring to the accompanying drawings that illustrate a portable telephone set as an embodiment of an information terminal according to the invention.

Figure 3:
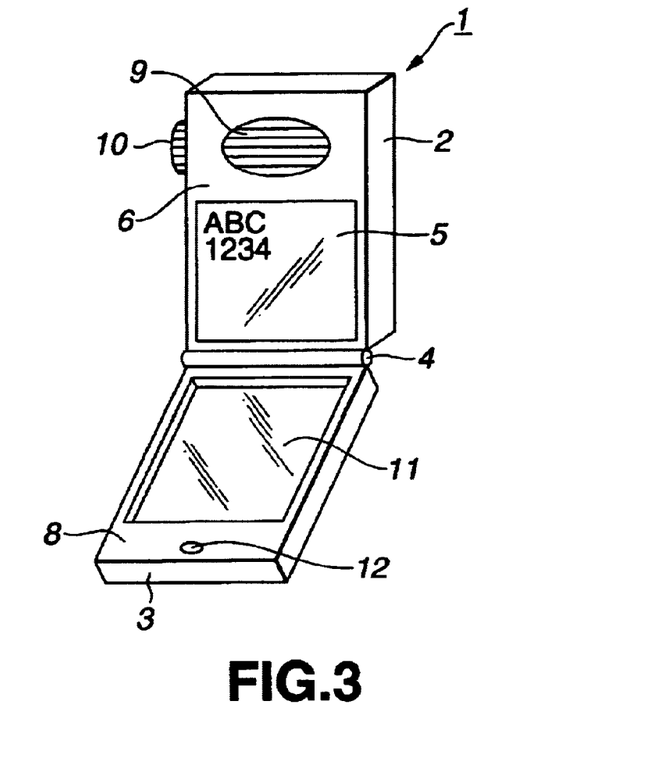
FIG. 3 is a schematic perspective view of a portable telephone set according to the invention and held in an open state.

As shown in FIG. 3, the portable telephone set 1 of this embodiment of the present invention comprises a substantially rectangularly parallelepipedic first housing 2, a second housing 3 having a profile substantially the same as that of the first housing 2 and a hinge section 4 fitted to an end of the first housing 2 and also to an end of the second housing 3.

The first housing 2 has a loudspeaker 9 for outputting sound, a jog dial 10 adapted to generate an operation signal each time it is rotated and depressed and a display section 5 for displaying data. The display section 5 is arranged close to the hinge section 4 on the first main surface 6 of the first housing 2. The loudspeaker 9 is arranged at the side opposite to the hinge section 4 on the first main surface of the first housing 2. The jog dial 10 is arranged at a lateral side of the first housing 2.

The second housing 3 has an input/display section 11 to be used for inputting and displaying data and a microphone 12 for inputting sound. The input/display section 11 is arranged close to the hinge section 4 on the second main surface 8 of the second housing 3. The microphone 12 is arranged at the side opposite to the hinge section 4 on the second main surface of the second housing 3.

Figure 4:
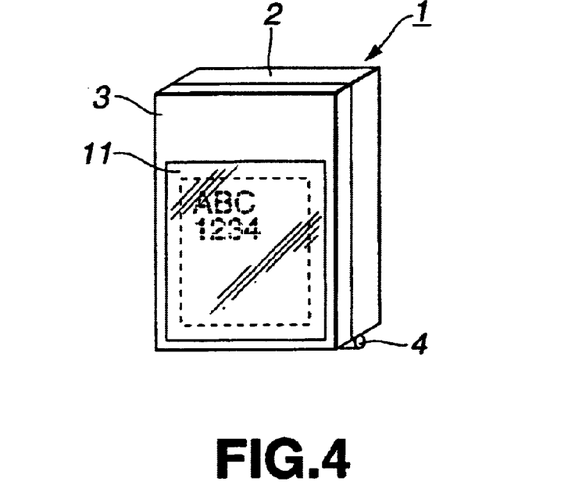
FIG. 4 is a schematic perspective view of the portable telephone set of FIG. 3 held in a closed state.

Thus, of the portable telephone set 1 having the above configuration, the first housing 2 and the second housing 3 are connected at the respective hinged ends thereof by way of the hinge section 4 so that the second housing 3 can be rotated around the hinge section 4 relative to the first housing 2. Then, the display section 5 arranged in the first housing 2 is covered by the second housing 3 as the first and second housings of the portable telephone set 1 are closed relative to each other and the first main surface 6 and the second main surface 8 are made to face each other as shown in FIG. 4. On the other hand, as shown in FIG. 3, the first housing 2 and the second housing 3 can be opened from each other to show a predetermined angle and be held to that relative position where the user can suitably operate the second housing 3 to talk with the person at the other end of the line or input character data. Hereinafter, the state where the display section 5 is covered by the second housing 3 is referred to as the closed state of the portable telephone set 1 whereas the state where the second housing 3 is opened and held to show a certain angle relative to the first housing 2 so that the user can comfortably talk or input character data is referred to as the open state of the portable telephone set 1.

In the open state of the portable telephone set 1, the user can talk to the person at the other end of the line or input character data. In the closed state of the portable telephone set 1, it is made very small and hence the user can comfortably put it in the pocket or some other suitable place to move with it.

The display section 5 comprises a rectangular liquid crystal display unit. The display section 5 shows the telephone number of the other end of the line when a user is talking through the telephone set, the sentence input by the user or the current time and/or the current condition of radio-wave propagation when the portable telephone set 1 is not in use.

Figure 5:
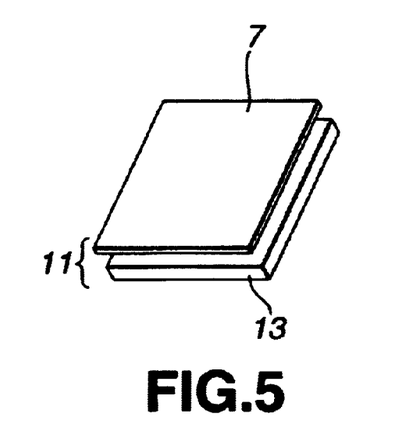
FIG. 5 is a schematic perspective view of the input/display section of the portable telephone set of FIG. 3, illustrating the components thereof.
Figure 6A:
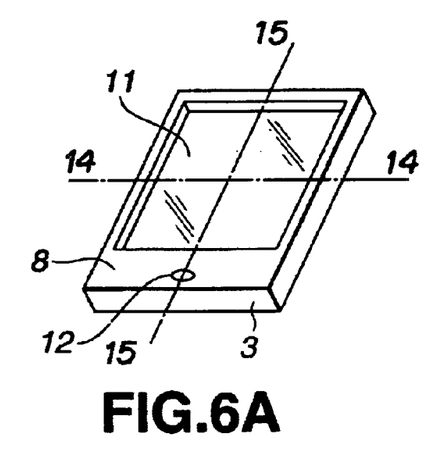
FIG. 6A is a schematic perspective view of the housing 3 of the portable telephone set of FIG. 3, illustrating the input/display section.
Figure 6B:
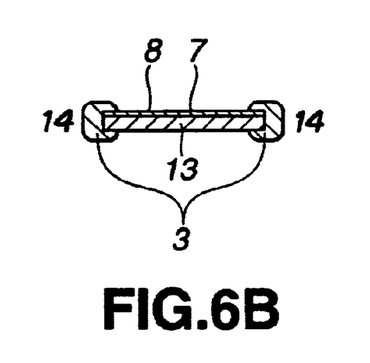
FIG. 6B is a schematic cross sectional view of the housing 3 taken along broken line 14—14 in FIG. 6A.
Figure 6C:
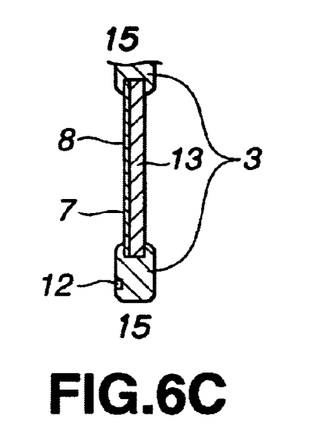
FIG. 6C is a schematic cross sectional view of the housing 3 taken along broken line 15—15 in FIG. 6A.

As shown in FIG. 5, the input/display section 11 comprises a transmission type LCD (liquid crystal display) 13 adapted to transmit light and provided with the functional feature of displaying information and a touch panel 7 also adapted to transmit light and provided with printed wires. The input/display section 11 is formed by bonding the touch panel to a major surface of the transmission type LCD 13. The input/display section 11 has rectangular major surfaces and the touch panel 7 is exposed on the second main surface 8 of the second housing 3 as shown in FIGS. 6A through 6C while the transmission type LCD 13 is exposed on the side opposite to the second main surface 8 of the second housing 3. The input/display section 11 is arranged in the second housing 3 in such a way that it is located vis-a-vis the display section 5 and the information displayed in the display section 5 is visible through the input/display section 11 when the portable telephone set 1 is in the closed state. The input/display section 11 may be provided with a transparent protection panel on the side opposite to the second main surface 8.

The input/display section 11 operates differently when the portable telephone set 1 is in the open state and when the latter is in the closed state as described below.

In the open state of the portable telephone set 1, the input/display section 11 displays various information and operates as display unit visible to the user because the transmission type LCD 13 is electrically energized in this state.

Additionally, in the open state of the portable telephone set 1, the input/display section 11 can also operate as input unit. When the input/display section 11 operates as input unit, the user depresses the part of the touch panel 7 that corresponds to the information displayed on the transmission type LCD 13.

Thus, as described above, in the open state of the portable telephone set 1, the input/display section 11 is visible to the user and the user can see the information on the transmission type LCD 13. Specific examples of information that can be displayed on the input/display section 11 when the latter operates as display unit include character messages received by the portable telephone set 1 and a list of telephone numbers stored in the memory. Specific examples of information that can be displayed on the input/display section when the latter operates as input unit include numerals necessary for calling the other end of the line and characters or codes necessary for the operation of inputting characters.

In the closed state of the portable telephone set 1, on the other hand, the input/display section 11 no longer operates as input unit nor as display unit and becomes transparent because the power supply to the transmission type LCD 13 is suspended. Thus, in the closed state of the portable telephone set 1, since the input/display section 11 becomes transparent and is located at a position suitable for the user to see the information displayed on the display section 5 therethrough, the information displayed on the display section 5 is clearly visible to the user.

As described above, since the input/display section 11 operates as display unit in the open state of the portable telephone set 1, a large volume of character data can be displayed there if combined with the display section 5. Additionally, the input/display section 11 also operates as input unit with which the user can input any part of the data displayed on the transmission type LCD 13 by depressing the touch panel at the corresponding part. Thus, the user can input not only numerals but also characters by way of the input/display section 11.

In the closed state of the portable telephone set 1, on the other hand, the input/display section 11 becomes transparent. Additionally, since the input/display section 11 is located at a position suitable for the user to see the information displayed on the display section 5 therethrough, the information displayed on the display section 5 is clearly visible to the user through the input/display section 11. In other words, in the closed state of the portable telephone set 1, the user can see the current time and/or the current condition of radio-wave propagation displayed on the display section 5 without turning the second housing 3 relative to the first housing 2 to bring the portable telephone set 1 into the open state.

The portable telephone set 1 may alternatively be so arranged that the information displayed on the transmission type LCD 13 is visible to the user from the side opposite to the second main surface 8 in the closed state of the portable telephone set 1.

Now, the configuration of the portable telephone set 1 will be described by referring to the block diagram of FIG. 7.

The portable telephone set 1 according to the invention comprises a transmitter/receiver section 20 for radio-wave transmission/reception, a display section 5 for displaying information, an input/display section 11 for inputting displaying information, a control section 21 for controlling the components of the portable telephone set 1, a microphone 12 for transforming a sound wave into an electric signal, a loudspeaker 9 for transforming an electric signal into acoustic energy, a power source 22 for supplying the related components of the portable telephone set 1 with power and a jog dial 10 to be used for the input operation and the display operation of the input/display section 11.

The display section 5 operates to display information in the form of numerals and characters according to the output signal from the control section 21.

Input/display section 11 comprises a transmission type LCD 13 and a touch panel 7. The transmission type LCD 13 displays information in the form of numerals and characters according to the signal fed from the control section 21 so as to be visible from the side of the second main-scanning 8. The touch panel 7 detects the pressure applied thereto by the user and sends a signal corresponding to the detected pressure to the control section 21.

The control section 21 typically comprises a CPU (central processing unit) and controls the operation of each of the operating sections of the portable telephone set 1 on the basis of the signal sent from the section. For example, the control section 21 establishes correspondence between the signal sent from the touch panel 7 and the information displayed on the transmission type LCD 13 to process the signal as the input of the user.

The microphone 12 generates an electric signal out of the acoustic energy it collects and supplies the generated signal to the control section 21.

The loudspeaker 9 transforms the sound signal fed from the control section 21 into sound and output the obtained sound.

The jog dial 10 is adapted to generate an input signal as it is rotated and depressed by the user and supplies the generated signal to the control section 21.

The transmitter/receiver section 20 transmits or receives signals typically by way of antenna.

Now, the processing operation of the portable telephone set 1 having the above configuration that is performed when the portable telephone set 1 is brought from the closed sate into the open state will be discussed below.

Figure 7:
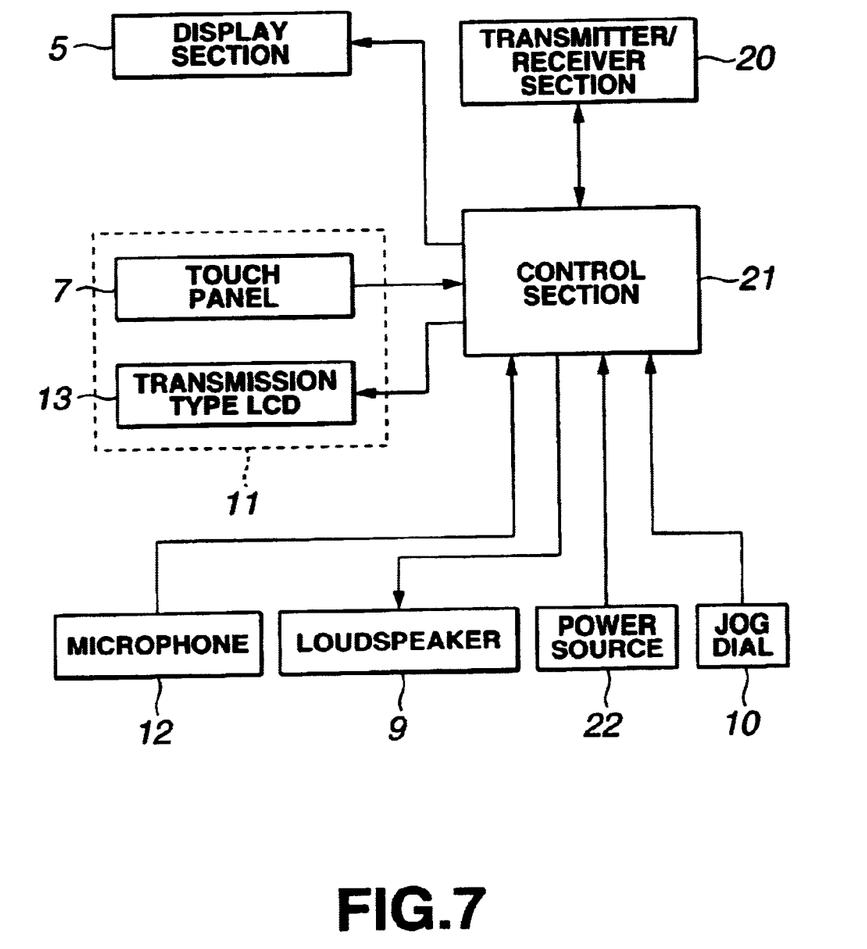
FIG. 7 is a schematic block diagram of a portable telephone set according to the invention.

When the portable telephone set 1 is brought from the closed state into the open state and hence the second housing 3 is rotated by way of the hinge section 4 to show a predetermined angle relative to the first housing 2, a sensor not shown in FIG. 7 recognizes that the portable telephone set 1 is in the open state and sends a signal representing the recognition to the control section 21. Then, the control section 21 sends a signal for driving the transmission type LCD 13 to operate on the basis of the programs and the data read and stored in the control section 21. The transmission type LCD 13 displays information on the basis of the signal fed from the control section 21 in such a way that the information is visible from the side of the second main surface 8.

Then, the processing operation of the portable telephone set 1 that is performed when the portable telephone set 1 is brought from the open state into the closed state will be discussed below.

When the portable telephone set 1 is brought from the open state into the closed state and hence the second housing 3 is rotated by way of the hinge section 4 to cover the display section 5 of the first housing 2, the sensor not shown in FIG. 7 recognizes that the portable telephone set 1 is in the closed state and sends a signal representing the recognition to the control section 21. Then, the control section 21 sends a signal for causing the transmission type LCD 13 to terminate the display of information. The transmission type LCD 13 terminates the display of information on the basis of the signal fed from the control section 21 to make itself transparent and the information on the display section 5 visible to the user.

Figure 8:
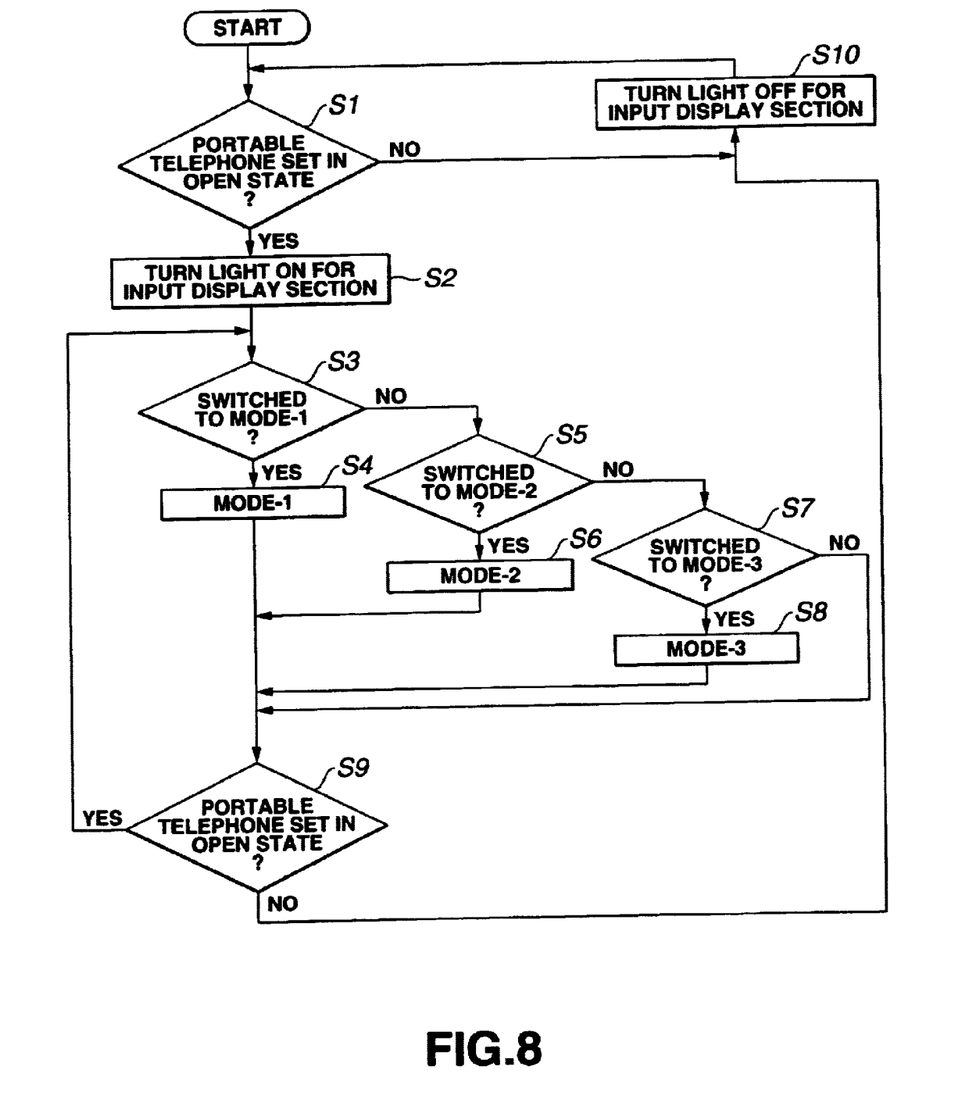
FIG. 8 is a flow chart illustrating the processing operation of the input/display section of a portable telephone set according to the invention.

Now, the processing operation for switching the input and display condition of the input/display section 11 will be discussed by referring to the flow chart of FIG. 8. The input and display condition of the input/display section 11 proceeds in one of the three different modes as will be described below. Note that the condition where the transmission type LCD 13 displays information and the entire surface of the touch panel 7 is operative is referred to as Mode-1 hereinafter.

The condition where the transmission type LCD 13 displays information and the entire surface of the touch panel 7 is inoperative, or the condition where the input/display section 11 operates solely as display unit, is referred to as Mode-2 hereinafter. Finally, the condition where the transmission type LCD 13 displays information and touch panel 7 is partly operative, or the condition where the part of the input/display section 11 where the touch panel 7 is operative can be used as input unit and the part of the input/display section 11 where the touch panel 7 is inoperative can be used as display unit, is referred to as Mode-3.

When the control section 21 recognizes that the power source 22 is activated by the user, it starts the following processing operation from Step S1.

Firstly in Step S1, the control section 21 determines if the portable telephone set 1 is in the open state or not. Then, the processing operation proceeds to Step S2 if it is determined by the control section 21 that the portable telephone set 1 is in the open state, whereas it proceeds to Step S10 if it is determined by the control section 21 that the portable telephone set 1 is not in the open state.

Then, in Step S2, the control section 21 energizes the transmission type LCD 13 of the input/display section 11 and displays information on the input/display section 11.

Subsequently, in Step S3, the control section 21 determines if the operating condition of the input/display section 11 is switched to Mode-1 typically by means of the jog dial 10 or not. If it is determined by the control section 21 that the operating condition of the input/display section 11 is switched to Mode-1, the processing operation proceeds to Step S4. If, on the other hand, it is determined by the control section 21 that the operating condition of the input/display section 11 is not switched to Mode-1, the processing operation proceeds to Step S5.

Figure 9:
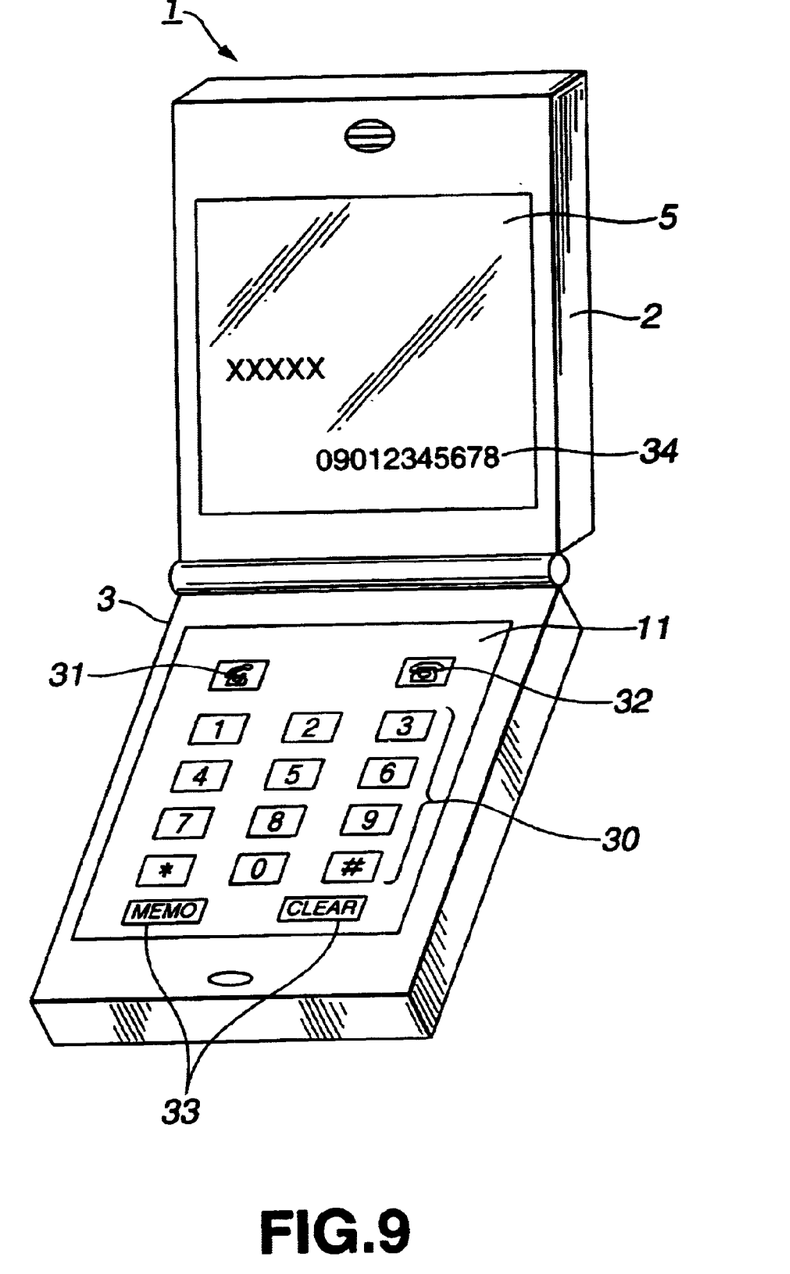
FIG. 9 is a schematic perspective view of a portable telephone set according to the invention, illustrating the input/display section operating in Mode-1.

Then, in Step S4, the control section 21 carries out the processing operation of Mode-1. In Mode-1, if the portable telephone set 1 is used for telephone conversation, keys including numerical keys 30, reception key 31, end key 32, function keys 33 such as memo key and clear key are displayed in the input/display section 11 so that an input operation is conducted as the parts of the touch panel 7 corresponding to the selected keys are depressed by the user. Then, the display section 5 displays the information input by the user by depressing the touch panel 7 such as the telephone number 34 to be called. Note, however, that the information that can be input by way of the input/display section 11 is not limited to a telephone number selected by the user for a call. For instance, the input/display section 11 may be made to display characters so that a piece of information expressed by characters may be input as the user sequentially depresses the parts of the touch panel 7 corresponding to the selected keys. After completing the above processing operation of Mode-1, the control section 21 proceeds to Step S9.

If, on the other hand, it is determined by the control section 21 in Step S3 that the operating condition of the input/display section 11 is not switched to Mode-1, the processing operation proceeds to Step S5.

Then, in Step S5, the control section 21 determines if the operating condition is switched to Mode-2 by means of the jog dial 10 or not.

If it is determined by the control section 21 in Step S5 that the operating condition of the input/display section 11 is switched to Mode-2, the processing operation proceeds to Step S6. If, on the other hand, it is determined by the control section 21 in Step S5 that the operating condition of the input/display section 11 is not switched to Mode-2, the processing operation proceeds to Step S7.

Figure 10:
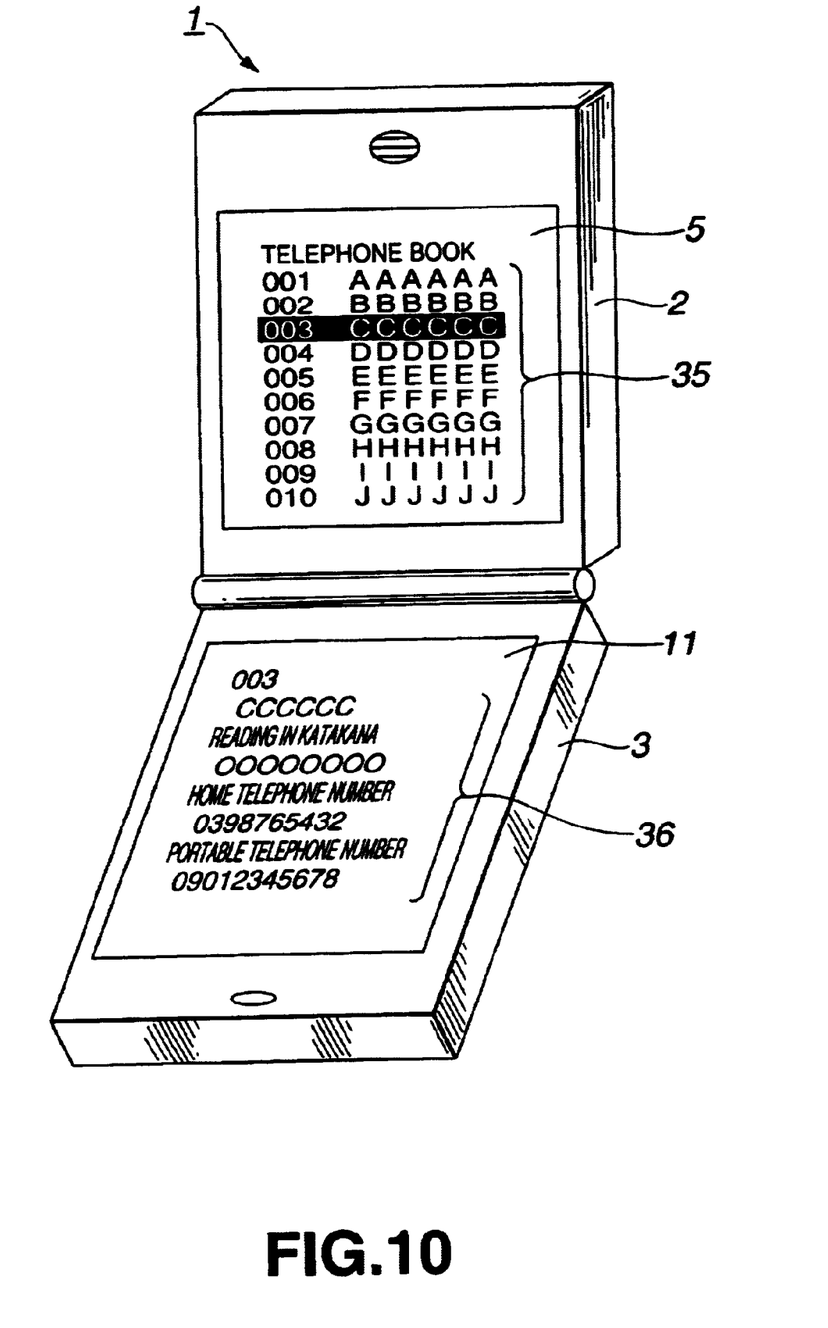
FIG. 10 is a schematic perspective view of a portable telephone set according to the invention, illustrating the input/display section operating in Mode-2.

Then, in Step S6, the control section 21 carries out the processing operation of Mode-2. In Mode-2, the input/display section 11 can display information independently from the display section 5 or information continued from or to the information being displayed in the display section 5. When the input/display section 11 displays information independently from the display section 5 in Mode-2, as shown in FIG. 10, the display section 5 may display a list of persons 35 stored in the telephone book while the input/display section 11 may display detailed information 36 on the person selected from the list of the display section 5 (such as reading of the name of the person in katakana, the home telephone number of the person and the telephone number of the portable telephone set of the person).

When the input/display section 11 displays information continued from or to the information being displayed in the display section 5 and the latter cannot display the entire message of the received E-mail, for instance, the input/display section 11 may be used to display the remaining part of the received message. After completing the above processing operation of Mode-2, the control section 21 proceeds to Step S9.

If, on the other hand, it is determined by the control section 21 in Step S5 that the operating condition of the input/display section 11 is not switched to Mode-2, the processing operation proceeds to Step S7. Then, in Step S7, the control section 21 determines if the operating condition is switched to Mode-3 by means of the jog dial 10 or not. If it is determined by the control section 21 in Step S7 that the operating condition of the input/display section 11 is switched to Mode-3, the processing operation proceeds to Step S8. If, on the other hand, it is determined by the control section 21 in Step S7 that the operating condition of the input/display section 11 is not switched to Mode-3, the processing operation proceeds to Step S9.

Figure 11:
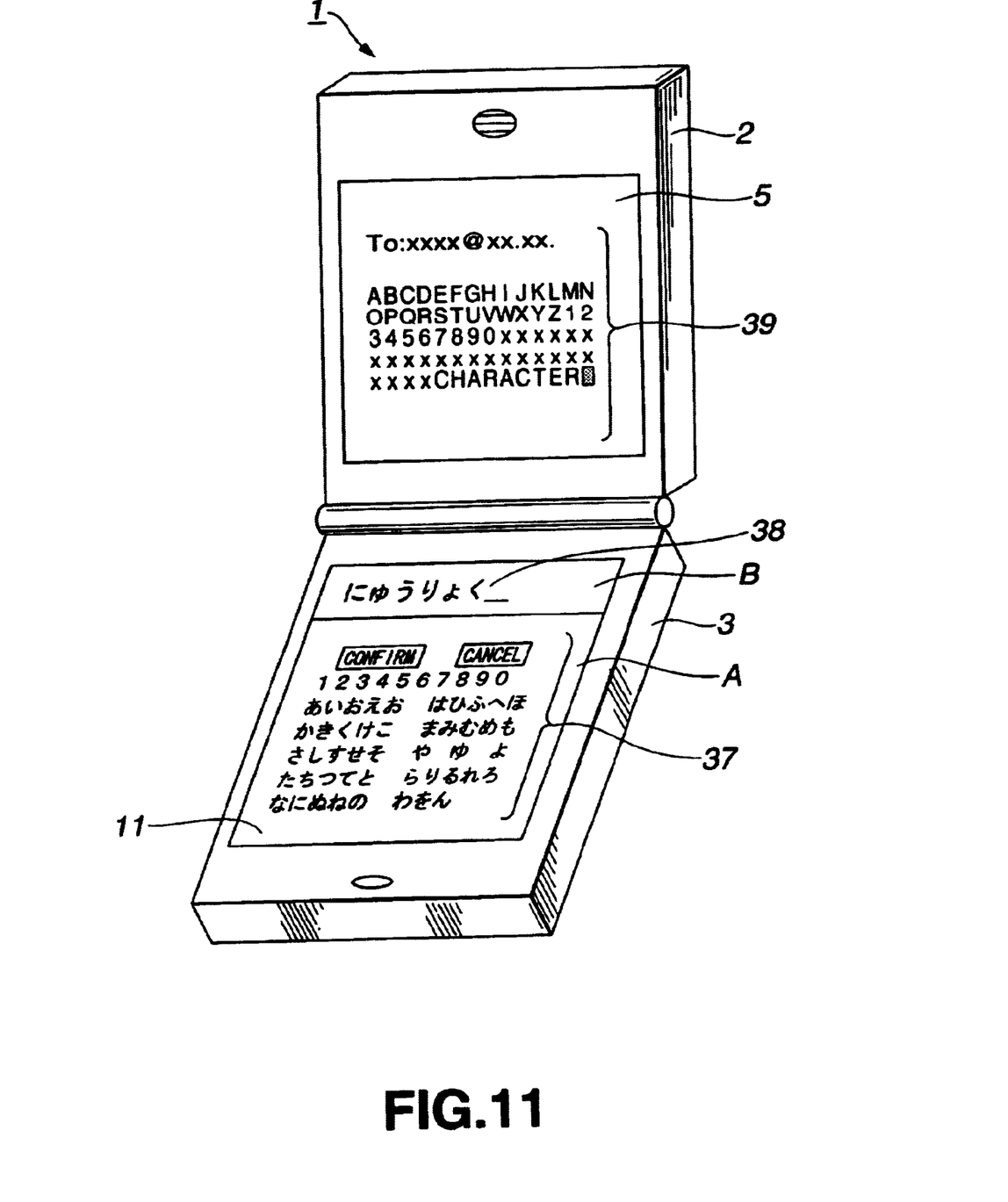
FIG. 11 is a schematic perspective view of a portable telephone set according to the invention, illustrating the input/display section operating in Mode-3.

Then, in Step S8, the control section 21 carries out the processing operation of Mode-3. In Mode-3, it is possible to define the area of the part of the input/display section 11 where the touch panel 7 is made operative and hence it can be used as input unit (hereinafter referred to as region A). Additionally, in Mode-3, it is possible to use the area of the part of the input/display section 11 where the touch panel 7 is not made operative and hence it can be used as display unit (hereinafter referred to as region B) to display information independently from the display section 5 or information continued from or to the information being displayed in the display section 5. When the region B is used to display information independently from the display section 5 and the information displayed in the region B may be the message to be transmitted by E-mail, the region A may be used to display keys of characters 37 as shown in FIG. 11 so that data may be input by sequentially depressing the parts of the touch panel 7 corresponding to the selected keys. Then, the region B may be used to display characters 38 that are input by means of the touch panel 7 but have not been confirmed yet of message being prepared.

When, on the other hand, the region B is used to display information continued from or to the information being displayed in the display section 5, it may be used to display the part of the message to be transmitted that cannot be displayed in the display section 5. After completing the above processing operation of Mode-3, the control section 21 proceeds to Step S9.

Then, in Step S9, the control section 21 determines if the portable telephone set 1 is in the open state or not. If it is determined by the control section 21 that the portable telephone set 1 is in the open state, the processing operation returns to Step S3. If, on the other hand, it is determined by the control section 21 that the portable telephone set 1 is not in the open state, the processing operation proceeds to Step S10.

Then, in Step S10, the control section 21 deenergizes the transmission type LCD 13 of the input/display section 11.

After completing Step S10, the processing operation returns to Step S1 and the control section 21 determines once again if the portable telephone set 1 remains in the open state or not. Thus, in the portable telephone set 1, the above processing operation is repeated until the power source 22 is turned off.

Thus, when the portable telephone set 1 is in the open state, the input/display section 11 can operate in various different ways as input unit and display unit depending on the purpose of the use of the portable telephone set 1 by controlling the area of the part of the input/display section 11 where the touch panel 7 is operative.

Note that the present invention is by no means limited to such a portable telephone set 1 and may alternatively be applied to a portable information terminal to realize a PDA (personal digital assistant) or some other information terminal.

As may be understood from the above description, an information terminal according to the invention comprising a first housing and a second housing can be made very compact and comfortably portable when the housings are folded relative to each other. Additionally, the input/display section arranged in the first housing and the display section arranged in the second housing can be used in a coordinated manner to enlarge the overall display area that can be used to display character information so as to make it possible to display and input various complex pieces of information. Thus, according to the invention, there is provided an information terminal that can be used to input and display various types of information. Furthermore, when an information terminal according to the invention is in the closed state, the input/display section becomes transparent so that the user can easily see the information displayed in the display section. Finally, an information terminal according to the invention allows the user to see the information displayed in the display section if the information terminal is in the closed state.

What is claimed is:

1. An information terminal comprising:
   a first housing having a display section for displaying information;
   a second housing;
   state shifting means including a hinge for rotatably linking said first and second housings and for selectively shifting the state of said information terminal between an open state wherein said first housing and said second housing are arranged such that said display section is not covered by said second housing and a closed state wherein said first housing and said second housing overlap each other such that said display section is covered by said second housing;
   an input/display section arranged in said second housing such that it is visible and operable in said open state so that information is input by manipulating said input/display section and displayed thereon; and
   control means for controlling said input/display section so as to make said input/display section transparent in said closed state so that said display section is visible though said input/display section.

2. The information terminal according to claim 1, wherein said input/display section comprises a transparent liquid crystal display unit and a transparent touch panel.

3. The information terminal according to claim 1, wherein said input/display section operates in one of:
   an all input mode wherein the entire area of said input/display section operates as an input section; and
   an all display mode wherein the entire area of said input/display section operates as a display section; and
   a partial input mode wherein a portion of the area of said input/display section operates as an input section; and
   said control means controls the operation of selecting said all input mode, said all display mode, and said partial input mode.

* * * * *